United States Patent [19]
Taylor
[11] Patent Number: 4,746,460
[45] Date of Patent: May 24, 1988

[54] PREPARATION OF EMULSIONS

[75] Inventor: Spencer E. Taylor, Camberley, England
[73] Assignee: The British Petroleum Company p.l.c., London, England

[21] Appl. No.: 800,959
[22] Filed: Nov. 22, 1985

[30] Foreign Application Priority Data
Dec. 7, 1984 [GB] United Kingdom ................. 8431012

[51] Int. Cl.[4] .............................................. B01J 13/00
[52] U.S. Cl. .................................... 252/314; 252/307; 252/312
[58] Field of Search ......................... 252/307, 312, 314

[56] References Cited

U.S. PATENT DOCUMENTS 3,416,320 12/1968 Asher ................................. 252/314
3,684,251 8/1972 Bowling ............................. 252/314
3,900,420 8/1975 Sebba ................................. 252/307
4,040,857 8/1977 Lissant ............................ 252/315.1
4,446,051 5/1984 Berthod et al. ...................... 252/309
4,486,333 12/1984 Sebba ................................. 252/314
4,536,325 8/1985 Borggrefe et al. .................. 252/314
4,539,139 9/1985 Ichikawa et al. ................... 252/314
4,606,913 8/1986 Aronson et al. .................... 252/312

FOREIGN PATENT DOCUMENTS 1132908 10/1982 Canada .

*Primary Examiner*—Edward A. Miller
*Attorney, Agent, or Firm*—Morgan & Finnegan

[57] ABSTRACT

An HIPR emulsion of oil in water is prepared by a method comprising the steps of (a) generating a foam by beating a gas into an aqueous solution of a surfactant and (b) dispersing the foam into the oil under low shear conditions in the range 10 to 1,000 reciprocal seconds in such manner that an emulsion is formed comprising distorted oil droplets having mean droplet diameters in the range 2 to 50 microns, separated by aqueous films, 70 to 98% by volume of the liquid content of the emulsion being oil.

The method is applicable to both high and low viscosity oils.

Depending on the nature of the oil, the emulsions can be used in the food, drug, cosmetics and petroleum industries.

7 Claims, 1 Drawing Sheet

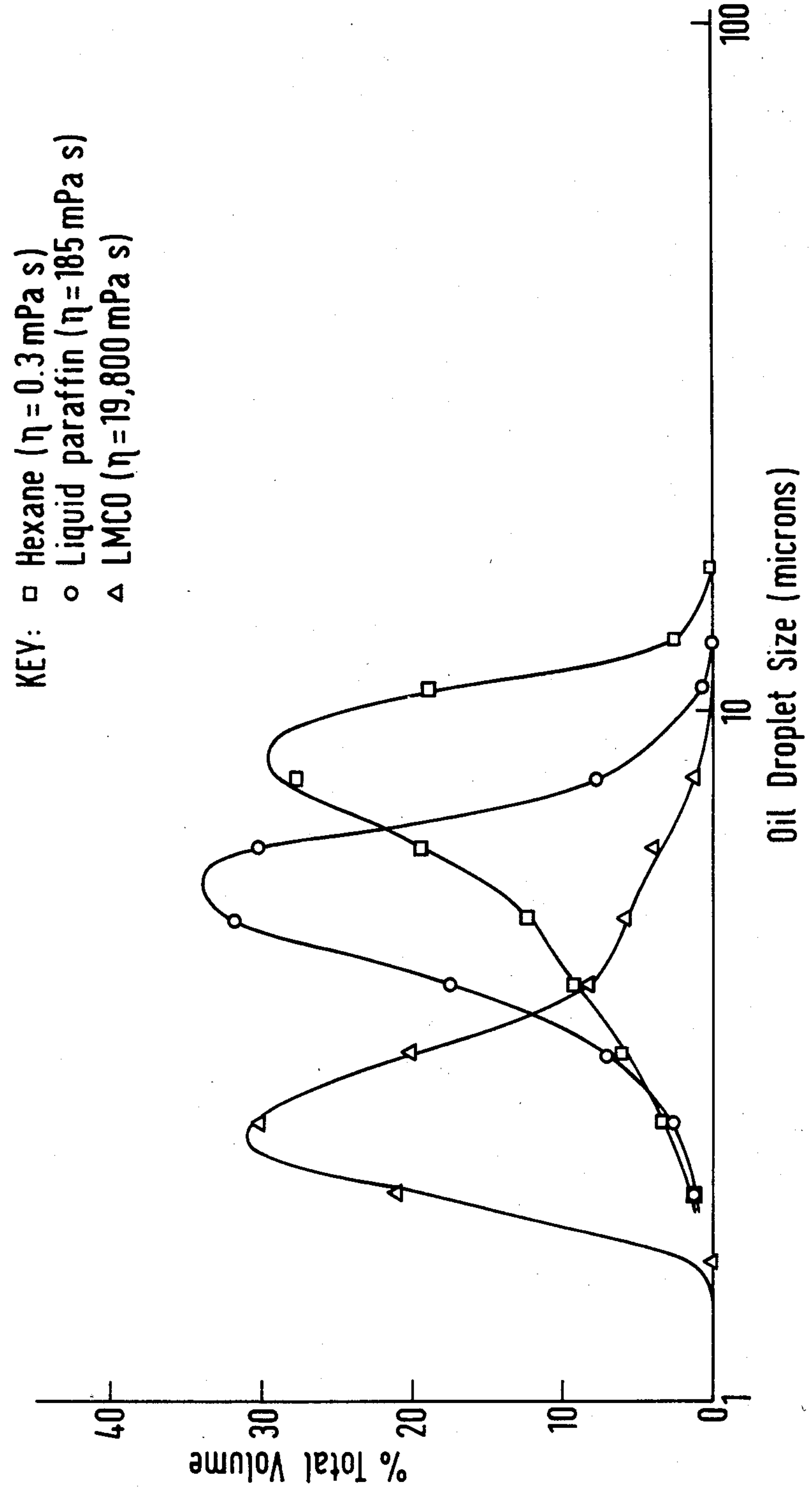
KEY: □ Hexane (η = 0.3 mPa s)
○ Liquid paraffin (η = 185 mPa s)
△ LMCO (η = 19,800 mPa s)
% Total Volume
0
10
20
30
40
Oil Droplet Size (microns)
1
10
100

PREPARATION OF EMULSIONS

This invention relates to a method for the preparation of emulsions of oil in water, and more particularly to a method for the preparation of high internal phase ratio (HIPR) emulsions of oils of low or high viscosity in water.

In the case of a system comprising dispersed spheres of equal size, the maximum internal phase volume occupied by a hexagonally close-packed arrangement is ca 74%. In practice, however, emulsions are rarely monodisperse and it is therefore possible to increase the packing density slightly without causing appreciable droplet distortion. Attempts to increase further the internal phase volume results in greater droplet deformation and, because of the larger interfacial area created, instability arises; this culminates in either phase inversion or emulsion breaking. Under exceptional circumstances, however, it is possible to create dispersions containing as high as 98% disperse phase volume without inversion or breaking.

Emulsified systems containing > 70% internal phase are known as HIPR emulsions. HIPR oil/water emulsions are normally prepared by dispersing increased amounts of oil into the continuous phase until the internal phase volume exceeds 70%. Clearly, for very high internal phase volumes, the systems cannot contain discrete spherical oil droplets; rather, they will consist of highly distorted oil droplets, separated by thin interfacial aqueous films.

Our copending European patent application No 0 156 486-A discloses a method for the preparation of an HIPR emulsion which method comprises directly mixing 70 to 98%, prefereably 80 to 90%, by volume of a viscous oil having a viscosity in the range 200 to 250,000 mPa.s at the mixing temperature with 30 to 2%, preferably 20 to 10%, by volume of an aqueous solution of an emulsifying surfactant or an alkali, percentages being expressed as percentages by volume of the total mixture; mixing being effected under low shear conditions in the range 10 to 1,000, preferably 50 to 250, reciprocal seconds in such manner that an emulsion is formed comprising highly distorted oil droplets having mean droplet diameters in the range 2 to 50 micron separated by thin interfacial films.

This represents an improved method for the preparation of HIPR emulsions in that the emulsions are directly prepared from a feedstock initially containing a high volume ratio of viscous oil to water using low energy mixing as opposed to high energy dispersing.

The above method is not, however, suitable for the preparation of HIPR emulsions from less viscous oils.

We have now discovered a method for the preparation of HIPR emulsions which is applicable to both low and high viscosity oils.

Thus according to the present invention there is provided a method for the preparation of an HIPR emulsion of oil in water which method comprises the steps of (a) generating a foam by beating a gas into an aqueous solution of a surfactant and (b) dispersing the foam into the oil under low shear conditions in the range 10 to 1,000, preferably 50 to 500, reciprocal seconds in such manner that an emulsion is formed comprising distorted oil droplets having mean droplet diameters in the range 2 to 50, preferably 5 to 20 micron separated by aqueous films, 70 to 98%, preferably 80 to 95% by volume of the liquid content of the emulsion being oil.

Suitable surfactants for use in the first stage include non-ionic surfactants such as nonyl phenol ethylene oxide condensates; ethoxylated secondary alcohols, ethoxylated sorbitan esters, ethoxylated amines and mixtures thereof. They are preferably used in relatively high concentration, e.g. 5 to 15% by weight of the total weight of water and surfactant, to generate stable foams having a high water content.

Air is, of course, the most convenient gas to employ in foam formation.

Suitable oils include light hydrocarbons, such as hexane and decane, intermediate materials such as liquid paraffin and heavy materials such as crude oils having API gravities in the range 5° to 20°.

The oils need not be mineral oils. Vegetable and animal oils are also suitable.

The foam may be generated in equipment such as spargers and beaters.

The oil and aqueous surfactant foam may be mixed with equipment known to be suitable for mixing viscous fluids, see H. F. Irving and R. L. Saxton, Mixing Theory and Practice (Eds. V. W. Uhl and J. B. Gray), Vol 1, Chap 8, Academic Press, 1966. Static mixers may also be used.

For a given mixer, the droplet size can be controlled by varying any or all of the three main parameters: mixing speed, mixing time and surfactant concentration. Increasing any or all of these will decrease the droplet size.

Temperature is not significant except insofar as it affects the viscosity of the oil.

A particularly suitable mixer is a vessel having rotating aras. Suitably the speed of rotation is in the range 500 to 1,200 rpm. Below 500 rpm mixing is relatively ineffective and/or excessive mixing times are required.

Suitable mixing times are in the range 5 seconds to 10 minutes. Similar remarks to those made above in respect of the speed range also apply to the time range.

The HIPR emulsions as prepared are stable and can be diluted with aqueous surfactant solution, fresh water or saline water to produce emulsions of lower oil phase volume showing high degrees of monodispersity. The emulsions may be diluted to a required viscosity without adversely affecting stability. Because the narrow size distribution is maintained upon dilution, the resulting emulsion shows little tendency to creaming. This in turn reduces the risk of phase separation occurring.

It is believed, although applicants do not wish to be bound by such theory, that the mechanism of formation involves the formation of a stable network of lamellae as a foam in the first stage and the subsequent dispersion of these lamellae through the oil in the second stage.

Depending on the nature of the oil, the emulsions can be used in the food, drug, cosmetics and petroleum industries and as fuels.

The invention is illustrated with reference to the following examples.

EXAMPLES 1-3

The oil phases examined were:

| Example | | |
|---|---|---|
| 1 | Hexane | (viscosity at 25° C. 0.3 mPa.s) |
| 2 | Liquid paraffin | (viscosity at 25° C. 185 mPa.s) |
| 3 | LMCO* | (viscosity at 25° C. 19,800 mPa.s) |

*Lake Marguerite crude oil from Canada.

The aqueous phase used in the emulsion preparation was simulated formation water containing 10% by wt of a nonyl phenol ethylene oxide condensate containing 10 mole equivalents of the latter.

The simulated formation water contained 20,000 ppm NaCl, 1,000 ppm KCl, 2,000 ppm $MgCl_2$, 1,000 ppm $CaCl_2$ and 500 ppm $NaHCO_3$.

The HIPR o/w emulsions from 90% (vol/vol) oil phase and 10% aqueous surfactant solution were prepared via a two-stage process:

(a) generating a concentrated, stable foam by beating air into the surfactant solution for one minute under low shear conditions, a few hundred reciprocal seconds, using a hand-held domestic mixer operating at 1000 rpm (during the course of which typically a five-fold increase in volume results), followed by (b) dispersing the foam into the oil phase using the same mixing conditions as in (a) for a period of two minutes.

The resulting HIPR emulsions were characterised in terms of their oil droplet size distribution by Coulter Counter analysis.

Stable emulsions were obtained with mean oil droplet sizes for Examples 1, 2 and 3 of 7.2, 5.8 and 3.8 microns respectively.

Results are set out in more detail in the accompanying drawing which depicts the droplet size distribution.

EXAMPLE 4

By way of comparison, an HIPR emulsion was prepared from LMCO by a similar process in which, however, the foaming stage was omitted. The mean oil droplet size was 3.5 microns. The product is therefore similar to that of Example 3.

EXAMPLES 5 and 6

Stable emulsions could not be prepared from hexane or liquid paraffin by the method of Example 4.

I claim:

1. A method for the preparation of an HIPR emulsion of oil in water which method comprises the steps of (a) generating a foam by beating a gas into an aqueous solution of a surfactant and (b) dispersing the foam into the oil under low shear conditions in the range 10 to 1,000 reciprocal seconds in such manner that an emulsion is formed comprising distorted oil droplets having mean droplet diameters in the range 2 to 50 microns, separated by aqueous films, to 98% by volume of the liquid content of the emulsion being oil.

2. A method for the preparation of an HIPR emulsion of oil in water according to claim 1 which method comprises the steps of (a) generating a foam by beating a gas into an aqueous solution of a surfactant and (b) dispersing the foam into the oil under low shear conditions in the range 50 to 500 reciprocal seconds in such manner that an emulsion is formed comprising distorted oil droplets having mean droplet diameters in the range 5 to 20 microns separated by aqueous films, 80 to 95% by volume of the liquid content of the emulsion being oil.

3. A method for the preparation of an HIPR emulsion according to claim 1 wherein the surfactant is a non-ionic surfactant.

4. A method for the preparation of an HIPR emulsion according to claim 1 wherein the surfactant is used in amount 5 to 15% by weight of the total weight of water and surfactant.

5. A method for the preparation of an HIPR emulsion according to claim 1 wherein the gas is air.

6. A method for the preparation of an HIPR emulsion according to claim 1 wherein the oil is a $C_{6-10}$ hydrocarbon or a mixture of such.

7. A method for the preparation of an emulsion of oil in water which method comprises the steps of preparing an HIPR emulsion by a method according to claim 1 and diluting the HIPR emulsion with an aqueous liquid.

* * * * *

UNITED STATES PATENT AND TRADEMARK OFFICE
CERTIFICATE OF CORRECTION

PATENT NO. : 4,746,460

DATED : May 24, 1988

INVENTOR(S) : SPENCER E. TAYLOR

It is certified that error appears in the above-identified patent and that said Letters Patent is hereby corrected as shown below:

Column 4, Claim 1, line 10, after the comma insert --70--.

Signed and Sealed this

Twenty-sixth Day of December, 1989

*Attest:*

JEFFREY M. SAMUELS

*Attesting Officer* *Acting Commissioner of Patents and Trademarks*